United States Patent [19]

Kano et al.

[11] Patent Number: 5,079,325
[45] Date of Patent: Jan. 7, 1992

[54] CHIPPING-RESISTANT COATING RESIN COMPOSITION, CHIPPING-RESISTANT COATING COMPOUND COMPOSITION AND FORMING PROCESS OF COATING FILM OF SAID COATING COMPOUND

[75] Inventors: Taisaku Kano, Yokohama; Hiroshi Nomura, Kamakura, both of Japan

[73] Assignee: Mitsui Toatsu Chemicals, Inc., Tokyo, Japan

[21] Appl. No.: 384,636

[22] Filed: Jul. 25, 1989

[30] Foreign Application Priority Data

Aug. 3, 1988 [JP] Japan ................ 63-192675

[51] Int. Cl.$^5$ ............................. C08G 18/80
[52] U.S. Cl. ....................... 528/45; 524/714; 524/722; 524/792
[58] Field of Search ............ 528/45; 524/722, 714, 524/792

[56] References Cited

U.S. PATENT DOCUMENTS

| 4,794,154 | 12/1988 | Benefiel ................. 528/45 |
| 4,841,008 | 6/1989 | Tsukamoto ............. 528/45 |

FOREIGN PATENT DOCUMENTS

| 0081729 | 6/1983 | European Pat. Off. . |
| 0139830 | 1/1986 | European Pat. Off. . |
| 0271972 | 6/1988 | European Pat. Off. . |
| 3143060 | 5/1983 | Fed. Rep. of Germany . |
| 87/07287 | 12/1987 | World Int. Prop. O. . |

Primary Examiner—John Kight, III
Assistant Examiner—Duc Truong
Attorney, Agent, or Firm—Burns, Doane, Swecker & Mathis

[57] ABSTRACT

A chipping-resistant coating resin composition having an active-hydrogen containing compound and a blocked isocyanate. The active-hydrogen containing compound is composed of
 (a) 100 parts by weight of a polyol (A) and
 (b) from 1 to about 30 parts by weight of a polyamine (B) and
(2) The blocked isocyanate (C) contains from about 1 to about 15 percent by weight of effective isocyanate groups, and is contained in a proportion wherein the equivalent ratio of the sum of the hydroxyl groups in the polyol (A) and the primary and/or secondary amino groups in the polyamine (B) to the effective isocyanate groups in the blocked isocyanate (C), that is, {(A)+(B)}:(C) is in the range of from about 50:100 to about 100:50, is disclosed.

A chipping-resistant coating compound composition containing, in addition to the above chipping-resistant coating resin composition, pigments, catalysts and/or stabilizers, is also disclosed.

Further, a process for forming coating films having a thickness of about 100 μm or more by applying and successively baking the above chipping-resistant coating compound composition, is disclosed.

14 Claims, No Drawings

CHIPPING-RESISTANT COATING RESIN COMPOSITION, CHIPPING-RESISTANT COATING COMPOUND COMPOSITION AND FORMING PROCESS OF COATING FILM OF SAID COATING COMPOUND

BACKGROUND OF THE INVENTION

The present invention relates to a chipping-resistant coating compound composition for use in rust prevention of motor vehicles. It also relates to a chipping-resistant coating resin composition contained in the coating compound composition, and further relates to a process for forming a of film of the coating compound composition.

Polyester resins, amino resins or polyester resins/blocked isocyanate resins have been used to date on the sides of motor vehicles.

These resins have excellent chipping resistance. However, thick coated parts evolve foaming in the course of baking due to solvents in the coating compound. Also, preferential curing of coating-film surface causes drawbacks such as marked deterioration of appearance. It has hence been very difficult to apply thick coating films having a thickness of about 500 $\mu$m or more.

The undersides of automobile floors have been primarily covered with polyvinyl chloride plastisol. Although the plastisol can provide thick coating films, it is inferior in adhesion to cation electrodeposition films and has the disadvantage of lowering chipping resistance after exposure to water.

Automotive coating is required sealing on the matched surfaces of steel plates. In this context the thickness of coating films increases to about 600 $\mu$m at the overlapped part of coating films having 200 $\mu$m in thickness. Consequently, it has been desired to provide a chipping-resistant coating resin composition which can be applied to form a thick coating film and an overlapped coating film and also has chipping-resistance when used as a thinner coating film of less than about 500 $\mu$m in thickness.

SUMMARY OF THE INVENTION

The present invention overcomes the above problems by providing a chipping-resistant coating resin composition which is superior to conventional compositions, a chipping-resistant coating compound composition containing the resin, and a process for forming of coating film a the coating compound.

An object of this invention is to provide a chipping-resistant coating resin composition which has chipping-resistance as a thin coating film, and can also be applied to form a thick coating film.

Another object of this invention is to provide a chipping-resistant coating compound composition containing the above resin composition and being capable of forming a good coating film.

A further object of this invention is to provide a process for forming a good coating film by using the above coating compound composition.

Additional objects and advantages of the invention will be set forth in part in the description which follows, and in part will be obvious from the description or may be learned by practice of the invention. The objects and advantages of the invention will be realized and attained by means of the instrumentalities and combinations, particularly pointed out in the applied claims.

The present invention provides a chipping-resistant coating resin composition having an active-hydrogen containing compound and a blocked isocyanate. The active-hydrogen containing compound comprises:

(a) 100 parts by weight of a polyol (A) and
(b) from about 1 to about 30 parts by weight of a polyamine (B) and The blocked isocyanate (C) contains from about 1 to about 15 percent by weight of effective isocyanate groups, and is contained in a proportion wherein the equivalent ratio of the sum of the hydroxyl groups in the polyol (A) and the primary and/or secondary amino groups in the polyamine (B) to the effective isocyanate groups in the blocked isocyanate (C), {(A)+(B)}:C, is in the range of from about 50:100 to about 100:50.

The present invention also provides a chipping-resistant coating compound composition which contains pigments, catalysts and/or stabilizers in addition to the above chipping-resistant coating resin composition.

Further, the present invention provides a process for forming the coating film having a thickness of 100 $\mu$m or more by applying the above chipping-resistant coating compound composition and then baking it.

The chipping-resistant coating resin composition and the chipping-resistant coating compound composition of this invention can be applied to form a thick coating film. The coating film obtained from the resin composition or the compound composition has excellent chipping-resistance, and good adhesion to substrates, good flexibility, toughness, outstanding impact resistance and good durability.

The film-forming process of this invention is suitable for forming a coating film composed of the above coating compound composition.

DETAILED DESCRIPTION OF THE INVENTION

The polyol (A) which is favorably used in this invention can be a selected from common polyols having a hydroxyl value of from about 3 to about 300 mgKOH/g. Examples include polyesterpolyol, polyetherpolyol, epoxy polyol, acrylic polyol, alkyd resin, and fats and oils modified by the polyhydric alcohol described hereinafter. These polyols can be used singly or in combination. Most preferred polyols are polyesterpolyol and polyetherpolyol because maximum level of non-volatile content is desired during application as performance of the chipping-resistant coating resin composition of this invention.

The chipping-resistant coating films are generally required to have chipping resistance, chipping resistance after exposure to water, fastness to cold-bend, adhesive property and impact resistance. As compared with the coating films prepared from polyesterpolyol and polyetherpolyol, the coating film prepared from epoxy polyol is liable to have poor fastness to cold-bend, the coating film from acrylic polyol has a low level of non-volatile content during application and is apt to be inferior in chipping resistance, and the coating film from alkyd resin or fats and oils modified by the polyhydric alcohol has a tendency to lower chipping resistance after exposure to water.

The polyesterpolyol used as polyol (A) in this invention can be prepared by conducting the condensation reaction of the below described polycarboxylic acid and polyhydric alcohol under temperature conditions ranging from about 150° to about 250° C. in the presence of a theoretically excess amount of hydroxyl groups to carboxyl groups.

The polycarboxylic acid is a compound having two or more carboxyl groups in a molecule and includes aromatic polycarboxylic acids, saturated or unsaturated aliphatic polycarboxylic acids, and alicyclic polycarboxylic acids. Any of the polycarboxylic acid can be used for this invention. Anhydrides of these polycarboxylic acids can also be used.

Exemplary polycarboxylic acids suitable for use in the present invention include, for example, aromatic polycarboxylic acids such as phthalic acid, phthalic anhydride, isophthalic acid, terephthalic acid and trimellitic acid; saturated or unsaturated aliphatic polycarboxylic acids such as succinic acid, azelaic acid, adipic acid, pimelic acid, sebacic acid, maleic anhydride and fumaric acid; saturated or unsaturated alicyclic polycarboxylic acids such as hexahydrophthalic acid, methylhexahydrophthalic acid, tetrahydrophthalic anhydride and methyltetrahydrophthalic anhydride. Hydroxy carboxylic acids having one or more carboxyl groups and one or more hydroxyl groups in the same molecule can also be used as a polycarboxylic acid. Illustrative hydroxy carboxylic acids include, for example, hydroxybenzoic acid, hydroxystearic acid and tartaric acid.

A polyhydric alcohol is a compound having two or more hydroxyl groups in a molecule and includes, for example, ethylene glycol, propylene glycol, butanediol, neopentyl glycol, trimethylpentanediol, diethylene glycol, dipropylene glycol, hydrogenated bisphenol-A, glycerol, trimethylolethane, trimethylolpropane, pentaerythritol, polyethylene glycol, polypropylene glycol and polytetramethylene ether glycol.

The polyetherpolyol used as polyol (A) in the present invention includes, for example, polyoxyethylene glycol, polyoxypropylene glycol, polyoxybutylene glycol, polyoxypropylenetriol, polyoxypropylenetetrol and a polyetherpolyol obtained by block or random copolymerization of ethylene oxide and propylene oxide. Polymer polyols prepared by grafting acrylic monomers to a part of the above polyetherpolyol can also be used in this invention.

The polyol (A) for use in this invention has a hydroxyl value of generally from about 30 to about 300 mg KOH/g and preferably from about 50 to about 200 mg KOH/g. A hydroxyl value lower than 30 mg KOH/g cannot provide sufficient cross-linking density and leads to a decrease in chipping resistance, chipping resistance after deterioration by water and adhesive property. A hydroxyl value higher than 300 mg KOH/g results in poor impact resistance and inferior fastness to coldbend of the cured coating film and hence cannot be employed for the chipping-resistant coating resin composition.

The polyamine (B) for use in the present invention is a compound having two or more primary and/or secondary amino groups in the molecule and includes, for example, amines containing only primary amino groups such as ethylenediamine, propylenediamine, xylylenediamine, hexamethylenediamine, bis(aminomethyl)cyclohexane, methylenebis(cyclohexylamine), 3-aminomethyl-3,5,5-trimethylcyclohexylamine and 1-methyl-2,4-diaminocyclohexane; and amines containing primary and secondary amino groups such as diethylenetriamine, triethylenetetramine, tetraethylenepentamine and pentaethylenehexamine.

Further, the polyamine (B) may also be employed in the form of an adduct with epoxy resin or used as a polyamide polyamine obtained by reacting the polyamine (B) with polybasic acids such as adipic acid, azelaic acid, succinic acid, glutaric acid and sebacic acid.

Additionally, the polyamine (B) for use in this invention may also be used in the form of ketimine or enamine by reacting with ketones.

In addition to the above exemplary polyamines, any compound containing either a primary amino group or secondary amino group in the molecule may also be used as the polyamine (B). The polyamine (B) can be used singly or as a mixture.

The polyamine (B) is used in an amount of from about 1 to about 30 parts by weight, and preferably from about 3 to about 15 parts by weight, per 100 parts by weight of the polyol (A). When the amount of the polyamine (B) is less than 1 part by weight, the resultant coating film evolves foaming and shrinkage. On the other hand, an amount of more than 30 parts by weight causes reduction of impact resistance and fastness to cold-bend.

The blocked isocyanate (C) for use in the present invention contains the effective isocyanate groups preferably in the range of from about 1 to about 15% by weight, and is prepared by reacting polyisocynate with a blocking agent at room temperature to protect activity of isocyanate groups from reaction with the polyol (A) and the polyamine (B). Exemplary polyisocyanates suitable for use in the preparation of the blocked isocyanate (C) includes, for example, aliphatic, alicyclic or aromatic polyisocyanate such as tolylene diisocyanate (TDI), m-phenylene diisocyanate, naphthylene diisocyanate, hexamethylene diisocyanate, isophorone diisocyanate, dicyclohexylpropane diisocyanate and trimethylpentane diisocyanate; biuret modified polyisocyanate; isocyanurate modified polyisocyanate; polymers of these polyisocyanates; and polyisocyanate adducts of the below described polyhydric alcohol.

The adduct can be obtained by reacting a theoretical excess of polyisocyanate with polyhydric alcohol. The polyhydric alcohol includes, for example, polyesterpolyol; polyetherpolyol; acrylic polyol; resins such as epoxy resin; diols such as ethylene glycol, propylene glycol and butanediol; triols such as trimethylolpropane, trimethylolethane and glycerol; and tetrols such as pentaerythritol.

The above blocking agent includes, for example, aliphatic and alicyclic alcohols such as methanol, ethanol, benzyl alcohol and cyclohexanol; phenols such as phenol, cresol and xylenol; oximes such as methyl ethyl ketone oxime and methyl isobutyl ketone oxime; lactams such as $\epsilon$-caprolactam and $\beta$-propiolactam; and active methylene containing compounds such as diethyl malonate, ethyl acetoacetate, butyl acetoacetate and acetylacetone. The blocking agent is preferably reacted with the above isocyanate in an active-H/NCO equivalent ratio of from about 1.0 to about 1.1, that is, under conditions in excess of the active hydrogen atoms contained in the blocking agent.

The content of effective isocyanate groups in the above blocked isocyanate (C) is a value obtained by dividing the total amount of isocyanate groups contained in the above polyisocyanates, modified polyisocyanates, and polymers and adducts of polyisocyanates, by the total amount of these polyisocyanates including the amount of the blocking agent. The value is expressed in percentage by weight.

The content of the above effective isocyanate groups in the invention is preferably from about 1 to about 15% by weight and more preferably from about 3 to about 12% by weight. An isocyanate content less than 1% by weight leads to poor chipping resistance because of insufficient cross-linking and cannot be used for the chipping-resistant coating resin composition. On the other hand, when the isocyanate content exceeds 15% by weight, the cured coating film becomes too hard and is poor in chipping resistance and fastness to cold-bend. Consequently, an isocyanate content higher than the above range cannot be used for the chipping-resistant coating resin composition.

In the formulation of this invention, the equivalent ratio of the sum of the hydroxyl groups in polyol (A) and the primary and secondary amino groups in polyamine (B) to the effective isocyanate groups in the blocked isocyanate (C), that is, {(A)+(B)}:(C), is in the range of from about 50:100 to about 100:50, and preferably in the range of from about 70:100 to about 100:70.

When the equivalent ratio {(A)+(B)}:(C) is smaller than 50:100, the cured coating film is liable to become too hard and has poor fastness to cold-bend. On the other hand, when the equivalent ratio {(A)+(B)}:(C) is larger than 100:50, curing and cross-linking proceed insufficiently, and chipping resistance and chipping resistance after exposure to water are decreased.

The chipping-resistant coating compound composition of this invention may contain, in addition to (A), (B) and (C) components, tertiary amines and organometallic catalysts such as tin compounds as the dissociation catalysts of the blocked isocyanate (C). When the resin composition of (A), (B) and (C), and the coating compound containing the resin compositon are required to provide stability such as prevention of viscosity increase with time, stabilizers may be added to the composition of this invention. The stabilizers are organic acids such as p-toluenesulfonic acid, dodecylbenzenesulfonic acid and monochloroacetic acid, and reaction inhibitors such as benzyl chloride which are generally used for urethane coating compounds.

The coating compound composition of this invention may be incorporated with various formulation ingredients in addition to the above components (A), (B) and (C). The formulating ingredients include, for example, inorganic pigments such as titanium oxide, carbon black, red iron oxide and oxide yellow; organic pigments such as phthalocyanine blue and phthalocyanine green; fillers such as clay, calcium carbonate, mica, vermiculite, China clay, barite and silica rock; additives such as leveling agents, cissing inhibitors, pigment dispersants and anti-sag agents; and organic solvents such as aliphatic solvents, aromatic solvents, ketones, esters and alcohols. Compounding may be carried out by using known equipment such as a stirrer called "disper", ball mill, sand grinder and roll mill.

In the film-forming process of this invention, the above chipping-resistant coating compound composition is applied to the surface of a desired substrate and baked to obtain a coating film having a thickness of about 100 μm or more, preferably about 200μm or more.

Known coating methods such as airless spraying and electrostatic coating may suitably be employed for the application of the coating compound composition of this invention. Baking temperature is preferably from about 120° C. to about 200° C.

The present invention will hereinafter be illustrated further in detail by way of examples and comparative examples, which examples do not limit the scope of this invention.

Parts and % illustrated in the examples and comparative examples are respectively parts by weight and % by weight.

Isocyanate content and hydroxyl value are expressed on the basis of non-volatile matter.

EXAMPLE 1

To a four necked flask equipped with a stirrer and a thermometer, 190 parts of phthalic anhydride, 384 parts of adipic acid, 60 parts of trimethylolpropane, 445 parts of neopentyl glycol and 0.5 part of dibutyltin oxide were charged. Dehydration reaction was carried out at a temperature of from 180° to 24° C. under introduction of nitrogen gas. The reaction was terminated when acid value of the reaction mixture was reached to 1.5. The resulting mixture was diluted by adding 125 parts of xylene and 125 parts of ethoxyethyl acetate. Polyesterpolyol (A-1) was thus prepared.

Polyesterpolyol (A-1) had a hydroxyl value of 80 mg KOH/g.

In the next step, 1000 parts of polypropylene glycol (PPG-1000 TM, a diol having a molecular weight of 1000), 134 parts of trimethylolpropane, 870 parts of TDI(80/20), 429 parts of xylene and 429 parts of ethoxyethyl acetate were charged to a four necked flask equipped with a stirrer, thermometer and an inert gas inlet tube. The mixture was reacted at a temperature of from 60° to 80° C. under introduction of nitrogen gas. The reaction was finished when the isocyanate content was reached to 10%. Prepolymer having terminal isocyanate groups was thus prepared.

Anoter four necked flask was charged with 1000 parts of the above prepolymer having terminal isocyanate groups and 150 parts of methyl ethyl ketone oxime was dropwise added gradually from a dropping funnel to carry out the reaction at a temperature of from 60° to 80° C. After finishing the dropwise addition, the mixture was reacted at 80° C. for about an hour and then diluted with xylene so as to obtain a non-volatile content of 60%. Blocked isocyanate (C-1) thus obtained had an effective isocyanate content of 8.2%.

A polyamide polyamine having an amine value of 214 and a non-volatile content of 100% (Epoky 162 TM, a product of Mitsui Toatsu Chemicals Inc.) was used as a polyamine (B-1).

A chipping-resistant coating resin composition was prepared by blending the above (A-1), (B-1) and (C-1) in proportions as illustrated in Table 1.

A chipping-resistant coating compound was prepared by adding formulation ingredients to the above chipping-resistant coating resin composition in proportions as illustrated in Table 1.

EXAMPLE 2

A four necked flask equipped with a stirrer, thermometer and an inert gas inlet tube was charged with 633 parts of adipic acid, 109 parts of trimethylolpropane, 206 parts of neopentyl glycol, 210 parts of diethylene glycol and 0.5 parts of dibutyltin oxide. The same procedures as in Example 1 were carried out to obtain polyol (A-2).

Polyol (A-2) thus obtained had a hydroxyl value of 100 mg KOH/g and a non-volatile content of 80%.

Another four necked flask equipped with a stirrer, thermometer and an inert gas inlet tube was charged with 1000 parts of a prepolymer which was obtained by reacting trimethylolpropane with tolylene diisocyanate and had a non-volatile content of 75% and an isocyanate content of 16% (Olester P49-7S TM, a product of Mitsui Toatsu Chemicals Inc.). To the prepolymer, 260 parts of methyl ethyl ketone oxime was dropwise added gradually from a dropping funnel and the reaction was carried out by the same procedures as in Example 1.

Blocked isocyanate (C-2) thus obtained had an effective isocyanate content of 11.9% and a non-volatile content of 60%.

Diethylenetriamine was used as a polyamine (B-) 2).

A chipping-resistant coating compound was prepared by blending the components (A-2), (B-2) and (C-2) and formulation ingredients in proportions as illustrated in Table 1.

EXAMPLES 3–8

Chipping-resistant coating compounds were prepared by blending the components used in Examples 1 and 2, that is, polyols (A-1) and (A-2), polyamines (B-1) and (B-2), blocked isocyanates (C-1) and (C-2), and formulation ingredients, in proportions as illustrated in Table 1.

COMPARATIVE EXAMPLES 1–6

A four necked flask equipped with a stirrer, thermometer and an inert gas inlet tube was charged with 1000 parts of crude diphenylmethane diisocyanate having an isocyanate content of 31% (MDI-CR-200 TM, a product of Mitsui Toatsu Chemicals Inc.) and 558 parts of xylene. To the solution obtained, 674 parts of methyl ethyl ketone oxime were dropwise added from a dropping funnel and the reaction was conducted by the same procedures as Example 1. The blocked isocyanate (C-3) thus obtained had an effective isocyanate content of 18.5% and a non-volatile content of 60%.

Chipping-resistant coating compounds were prpared by blending the components obtained in examples and comparative examples, that is, polyol (A-1), polyamine (B-1), blocked isocyanate (C-1), blocked isocyanate (C-3) and formulation ingredients in proportions as illustrated in Table 2.

TABLE 1

|  | Example (parts by weight) | | | | | | | |
|---|---|---|---|---|---|---|---|---|
|  | 1 | 2 | 3 | 4 | 5 | 6 | 7 | 8 |
| Polyol (A-1) | 100 | — | 100 | 100 | 100 | — | 100 | 100 |
| Polyol (A-2) | — | 100 | — | — | — | 100 | — | — |
| Polyamine (B-1) | 5 | — | 10 | 15 | — | 10 | 10 | 10 |
| Polyamine (B-2) | — | 5 | — | — | 10 | — | — | — |
| Blocked isocyanate (C-1) | 121 | — | 144 | 167 | — | 371 | 240 | 86 |
| Blocked isocyanate (C-2) | — | 168 | — | — | 239 | — | — | — |
| Calcium carbonate | 234 | 276 | 262 | 297 | 347 | 464 | 347 | 210 |
| Carbon black | 2 | 3 | 3 | 3 | 3 | 5 | 4 | 2 |
| (Hydroxyl group + primary amino group + secondary amino group):effective isocyanate group (equivalent ratio) | 100:100 | 100:100 | 100:100 | 100:100 | 100:100 | 100:100 | 60:100 | 100:60 |
| Dried film thickness (μm) | 340 | 360 | 330 | 340 | 350 | 340 | 350 | 360 |

TABLE 2

|  | Comparative example (parts by weight) | | | | | |
|---|---|---|---|---|---|---|
|  | 1 | 2 | 3 | 4 | 5 | 6 |
| Polyol (A-1) | 100 | 100 | 100 | 100 | 100 | 100 |
| Polyamine (B-1) | — | 0.5 | 35 | 10 | 10 | 10 |
| Blocked isocyanate (C-1) | 97 | 100 | 261 | — | 360 | 58 |
| Blocked isocyanate (C-3) | — | — | — | 64 | — | — |
| Calcium carbonate | 205 | 209 | 396 | 191 | 454 | 185 |
| Carbon black | 2 | 2 | 4 | 2 | 5 | 2 |
| (Hydroxyl group + primary amino group + secondary amino group):effective isocyanate group (equivalent ratio) | 100:100 | 100:100 | 100:100 | 100:100 | 40:100 | 100:40 |
| Dried film thickness (μm) | (*) 340 | (*) 350 | 330 | 360 | 340 | 350 |

Note:
(*) Preheating ... 100° C., 20 min
Baking ... 150° C., 30 min

The coating compounds prepared in the examples and comparative examples were adjusted their viscosity into the range of from 4000 to 5000 cps at 20° C. and applied with a airless spray gun to the surface of an epoxy-base-cation electro-deposited plate so as to obtain a dried film thickness of 350 μm.

The coated plate was allowed to stand for 5 minutes at room temperature and cured by baking at 150° C. in air for 30 minutes.

Results on the evaluation of cured film are illustrated in Table 3.

The coating compounds were also applied so as to obtain different film thicknesses allowed to stand 5 minutes at room temperature and baked at 150° C. in air for 30 minutes. The results are illustrated in Table 3.

As clearly understood from Table 3, the dipping-resistant coating compositions of this invention which are illustrted in Examples 1-8 can be applied to form a thick coating film and are excellent in chipping resistance and other film properties such as cold-bend property, impact resistance and salt water resistance as compared with comparative coating compositions.

degrees, and occurrence of cracks and delamination is checked. Normal temperature test is carried out at 20° C. in air. Low temperature test is conducted immediately after holding at −30° C. for 3 hours.

TABLE 3

| Item | Example | | | | | | | | Comparative Example | | | | | |
|---|---|---|---|---|---|---|---|---|---|---|---|---|---|---|
| | 1 | 2 | 3 | 4 | 5 | 6 | 7 | 8 | 1 | 2 | 3 | 4 | 5 | 6 |
| Adhesion | | | | | | | | | | | | | | |
| Normal condition | 100/100 | 100/100 | 100/100 | 100/100 | 100/100 | 100/100 | 100/100 | 100/100 | 100/100 | 100/100 | 100/100 | 100/100 | 100/100 | 100/100 |
| After warm water aging | 100/100 | 100/100 | 100/100 | 100/100 | 100/100 | 100/100 | 100/100 | 100/100 | 100/100 | 100/100 | 100/100 | 100/100 | 0/100 | 0/100 |
| After heat aging | 100/100 | 100/100 | 100/100 | 100/100 | 100/100 | 100/100 | 100/100 | 100/100 | 100/100 | 100/100 | 100/100 | 100/100 | 0/100 | 0/100 |
| Cold-bend | good | good | good | good | good | good | good | good | good | good | delaminated | delaminated | delaminated | good |
| Impact resistance | | | | | | | | | | | | | | |
| Normal temperature | good | good | good | good | good | good | good | good | good | good | good | delaminated | delaminated | good |
| Low temperature | good | good | good | good | good | good | good | good | good | good | delaminated | delaminated | delaminated | good |
| Salt spray resistance (mm) | <1 | <1 | <1 | <1 | <1 | <1 | <1 | <1 | <1 | <1 | <1 | <1 | 3.2 | 4.1 |
| Chipping resistance | | | | | | | | | | | | | | |
| Initial (kg) | 50 | 48 | 55 | 58 | 49 | 53 | 47 | 45 | 40 | 43 | 52 | 48 | 40 | 28 |
| After warm water immersion (kg) | 45 | 42 | 49 | 52 | 41 | 47 | 42 | 40 | 32 | 35 | 47 | 38 | 26 | 9 |
| Film thickness limit (μm) | 800 | 750 | 1000< | 1000< | 1000< | 1000< | 1000< | 1000< | 100 | 300 | 1000< | 1000< | 1000< | 1000< |

Method for testing the coating film Adhesion test (cross cut adhesion test)

A coating film having a prescribed thickness is applied to the surface of an electrodeposited metal plate having dimensions of 70×150×0.8 mm and used for the specimen. Cross cut of 10×10 square sections having a depth reaching to the metal surface are made at each line interval of 2 mm. A cellophane tape is sticked to the cross cut parts and pulled back. Peeling of the coating film is visually observed. Numbers of cross cuts which remain adhered on the metal surface are shown in Table 3.

Normal condition test is conducted in air at 20° C. Warm water aging test is conducted by immersing the sample into water at 40° C. for 10 days. Heat aging test was conducted at 70° C. in air for 10 days.

Cold-bend test

A coating film having a prescribed thickness is applied to the surface of an electrodeposited metal plate having dimensions of 70×150×0.8 mm and used for the specimen. The specimen is held in a low temperature bath at −30° C. for 3 hours. Then the specimen is taken out of the bath and is immediately bent under holding the coated surface outside at an angle of 180 degrees along the surface of a mandrel having a diameter of 25 mm. The coating film on the bent surface is subjected to a tape peeling test, and cracks and crazes are checked.

Impact resistance test

A coating film having a prescribed thickness is applied to the surface of an electrodeposited metal plate having dimensions of 70×150×0.8 mm and used for the specimen. The test is carried out in accordance with JIS K-6830-26. An impact is provided from an angle of 90

Salt spray test

The specimen prepared by the same procedures as above is used.

A cut having a depth reaching to the metal surface is made on the coating film at the center of the specimen. After holding the specimen in a salt water spraying machine for 240 hours, the cellophane tape peeling test is carried out on the cut surface and maximum peeled length is measured.

Chipping resistance test:

The specimen prepared by the same procedures as above is used. A brass hexagonal nut of class 3-M-4 type specified in JIS B 1181 is dropped from a height of 3 m through a tube having a diameter of 40 mm on the specimen holded at an angle of 30 degrees to the falling direction of the brass nut. Chipping resistance is indicated by the weight of the brass nut when the depth of a mark made on the coating film is reached to the metal surface. Warm water immersion test is carried out at 40° C. for 10 days.

Film thickness limit test

A coating film is applied to the surface of an electrodeposited metal surface and allowed to stand for 5 minutes at room temperature. After baking at 150° C. in air for 30 minutes, cured film surface is visually observed. The film thickness limit is indicated by the minimum thickness which causes no defects such as foaming and shrinkage.

What is claimed is:

1. A chipping-resistant coating resin composition of (i) an active-hydrogen containing compound and (ii) a blocked isocyanate (C); wherein the active-hydrogen containing compound (i) comprises:
(a) 100 parts by weight of a polyol (A) and
(b) from about 1 to about 30 parts by weight of a polyamine (B) selected from a polyamide polyamine or a diethylene triamine wherein;
the blocked isocyanate (C) contains from about 1 to 15 percent by weight of effective isocyanate groups; and wherein
the blocked isocyanate (C) is contained in a proportion wherein the equivalent ratio of the sum of the hydroxyl groups in polyol (A) and the primary and/or secondary amino groups in polyamine (B) to the effective isocyanate groups in the blocked isocyanate (C), {(A)+(B)}:(C), ranges from about 50:100 to about 100:50.

2. A chipping-resistant coating resin composition according to claim 1 wherein polyol (A) has a hydroxyl value of from about 30 to about 300 mg KOH/g.

3. A chipping-resistant coating resin composition according to claim 1 wherein polyol (A) has a hydroxyl value of from about 50 to about 200 mg KOH/g.

4. A chipping-resistant coating resin composition according to claim 1 wherein polyol (A) is a polyetherpolyol and/or a polyesterpolyol.

5. A chipping-resistant coating resin composition according to claim 1 wherein polyamine (B) is contained in a proportion of from about 3 to about 15 parts by weight per 100 parts by weight of polyol (A).

6. A chipping-resistant coating resin composition according to claim 1 wherein the equivalent ratio of the sum of the hydroxyl groups in polyol (A) and the primary and/or secondary amino groups in polyamine (B) to the effective isocyanate amino groups in polyamine (C) {(A)+(B)}:(C) is in the range of from about 70:100 to about 100:70.

7. A chipping-resistant coating resin composition according to claim 1 wherein blocked isocyanate (C) has an effective isocyanate content of from about 3 to about 12 percent by weight.

8. A chipping-resistant coating resin composition according to claim 1 wherein blocked isocyanate (C) is obtained by reacting an aliphatic, alicyclic or aromatic polyisocyanate, a biuret modified polyisocyanate, an isocyanurate modified polyisocyanate, a polymer of the polyisocyanate or a polyisocyanate adduct of a polyhydric alcohol, with a blocking agent.

9. A chipping-resistant coating resin composition according to claim 8 wherein the blocking agent is an aliphatic or alicyclic alcohol, a phenol, an oxime, a lactam, a malonic diester or an acetoacetic ester.

10. A chipping-resistant coating resin composition according to claim 9 wherein the blocking agent is methyl ethyl ketone oxime, methyl isobutyl keton oxime, or $\epsilon$-caproloctam.

11. A chipping-resistant coating compound composition comprising the resin composition of claim 1 and one or more substances selected from the group consisting of an inorganic pigment, an organic pigment, an organometallic compound, a tertiary amine, an organic acid and benzyl chloride.

12. A process for forming a coating film having a thickness of about 100 $\mu$m or more which comprises applying a chipping-resistant coating compound composition according to claim 11 and baking the composition.

13. A process according to claim 12 wherein the thickness of the film is about 200 $\mu$m or more.

14. A process according to claim 12 wherein baking is carried out at a temperature of from about 120° C. to about 200° C.

* * * * *

UNITED STATES PATENT AND TRADEMARK OFFICE
CERTIFICATE OF CORRECTION

PATENT NO. : 5,079,325

DATED : January 7, 1992

INVENTOR(S) : Taisaku KANO et al

It is certified that error appears in the above-identified patent and that said Letters Patent is hereby corrected as shown below:

In column 11, line 38, delete "polyamine" and insert therefor --the blocked isocyanate--.

In column 12, line 1, after "(C)" insert --,--

In column 12, line 20, amend "keton" to --ketone--.

In column 12, line 21, amend "caproloctam" to --caprolactam--.

Signed and Sealed this

Twenty-first Day of September, 1993

Attest:

Attesting Officer

BRUCE LEHMAN

Commissioner of Patents and Trademarks